(12) United States Patent
Mogi et al.

(10) Patent No.: US 6,952,061 B2
(45) Date of Patent: Oct. 4, 2005

(54) MOTOR DRIVE UNIT

(75) Inventors: Seiichi Mogi, Saitama (JP); Kiyoshi Kimura, Saitama (JP)

(73) Assignee: Honda Motor Co., LTD, Tokyo (JP)

( * ) Notice: Subject to any disclaimer, the term of this patent is extended or adjusted under 35 U.S.C. 154(b) by 51 days.

(21) Appl. No.: 10/694,405

(22) Filed: Oct. 28, 2003

(65) Prior Publication Data

US 2004/0130224 A1 Jul. 8, 2004

(30) Foreign Application Priority Data

Nov. 28, 2002 (JP) ........................................ 2002-345212
Jul. 8, 2003 (JP) ........................................ 2003-193416

(51) Int. Cl.$^7$ .................. H02K 5/173; H02K 23/00; F16C 25/08
(52) U.S. Cl. ........................................ 310/90; 310/75 R
(58) Field of Search ................................ 310/75 R, 90, 310/91, 51; 384/303

(56) References Cited

U.S. PATENT DOCUMENTS

| | | | | |
|---|---|---|---|---|
| 3,816,782 A | * | 6/1974 | Dow et al. | 310/90 |
| 5,533,712 A | * | 7/1996 | Fujikawa et al. | 254/362 |
| 6,375,442 B1 | * | 4/2002 | Ward et al. | 418/69 |
| 6,376,952 B1 | * | 4/2002 | Stenta | 310/90 |

FOREIGN PATENT DOCUMENTS

| | | |
|---|---|---|
| JP | 8-23049 | 9/1996 |
| JP | 2002-188452 | * 7/2002 |
| JP | 2003-88035 | 3/2003 |

* cited by examiner

Primary Examiner—Tran Nguyen
(74) Attorney, Agent, or Firm—Arent Fox PLLC

(57) ABSTRACT

A motor drive unit 1 comprises an input shaft 10, a countershaft 20, a couple of helical gears, a housing 5 and a seventh bearing 57. The input shaft 10 is connected with the rotor shaft 60 of an electrical motor M for driving a vehicle, and the countershaft 20 is disposed in parallel with the input shaft 10, for rotational connection leading to drive wheels of the vehicle. The helical gears comprise a first gear 12 and a second gear 22, which enable power transmission from the input shaft 10 to the countershaft 20, and the housing 5 covers and retains the electrical motor M. The seventh bearing 57 is mounted in the housing 5, and it retains rotatably the end of the rotor shaft 60 that is located opposite to the coupled portion 14 of the rotor shaft 60 and the input shaft 10. At the coupled portion 14, a wave spring 82 is sandwiched between the rotor shaft 60 and the input shaft 10, so that the wave spring 82 pushes the rotor shaft 60 and the input shaft 10 axially away from each other, with the rotor shaft 60 pushing the housing 5 axially via the seventh bearing 57. Furthermore, the drive unit is arranged such that while the electrical motor M is in operation, an axial thrust acting on the input shaft 10 from the first gear 12 pushes the input shaft 10 to the rotor shaft 60. In this arrangement, the pushing force by which the rotor shaft 60 pushes the housing 5 is variable in correspondence to the operational condition of the electrical motor M.

8 Claims, 11 Drawing Sheets

$F_1 : F_2 = b : a$

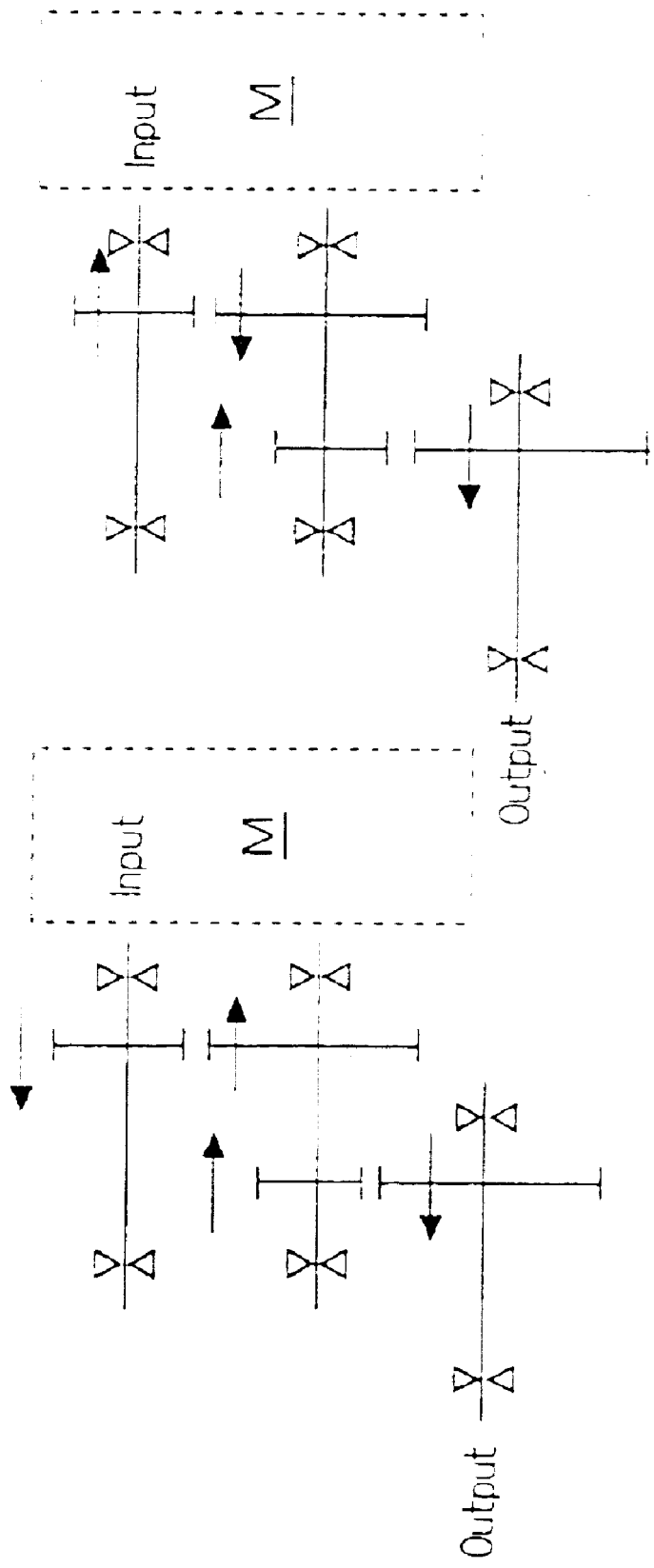

MOTOR DRIVE UNIT

FIELD OF THE INVENTION

The present invention relates generally to a motor drive unit used for a vehicular power transmission and particularly to a motor drive unit which is designed to restrain sound propagation from its housing being vibrated by a motor driving an electric motorcar.

BACKGROUND OF THE INVENTION

Conventionally, in electric motorcars, a drive unit that is used to transmit the power of a motor to drive wheels to drive a vehicle generally comprises an input shaft, a countershaft and an output shaft. The input shaft is coupled with the output shaft of the motor, which provide a driving power, and the countershaft is rotationally connected to the input shaft to transmit the power from the input shaft. The output shaft of the drive unit is rotationally connected to transmit the power from the countershaft to the drive wheels. For the rotational connection, gears are provided around the respective shafts in the drive unit, so that the power of the motor is transmitted to the drive wheels. In addition, bearings are provided to rotationally support the respective shafts at both the ends thereof inside the drive unit (refer to, for example, Japanese Laid-Open Patent Publication No. H08(1996)-230489).

Among those bearings, a second bearing that supports the motor-side end of the input shaft of the drive unit functions also as a supporting point for the output shaft of the motor, so the inner ring of this bearing is fit over the output shaft of the motor. The output shaft of the motor and the input shaft of the drive unit are fit by splines to securely transmit the power (torque). Spline fitting is a coupling method in which multiple tongues and grooves like keys are provided axially at even intervals around respective shafts that are to be coupled, and when these shafts are coupled, the fitting allows each shaft rotating to move axially within a certain range. Excluding serration fittings, which have no clearance and are intended for permanent fit, spline fittings are generally looser and the degrees of their concentricity are lower than ordinary fittings of shafts and bores.

Therefore, when a high-frequency vibration generated at the motor is transmitted from the output shaft of the motor to the second bearing, it is difficult to restrain the vibration there. Moreover, the vibration is often intensified there, and it propagates to the motor case. As a result, the motor case happens to vibrate like a membrane as if it were a speaker.

One method to prevent such a problem is to press and fit the splined parts as practiced in the fitting of the countershaft, so that the rotating shafts may be avoided of vibrations. However, the application of press-fitting for the input shaft reduces the workability for mounting the drive unit onto the motor case. Therefore, it is difficult to adopt this method immediately at this point.

Another idea is that, instead of the single second bearing, two bearings may-be placed to support the output shaft of the motor and the input shaft of the drive unit separately, and a spline fitting may be provided to couple these shafts between these two bearings. The placement of the two bearings and the spline fitting require a relatively large space, so the size as well as the weight of the drive unit must increase. Therefore, this method is not preferable.

As a method for reducing sounds coming from the drives of electric motorcars, a vibration-reducing technology for a vehicle-driving motor as prime mover (hereinafter referred to as "electrical motor") is known for vibration and sound insulation and absorption (refer to, for example, Japanese Laid-Open Patent Publication No. 2003-88035). By the way, it is typical in electrical motorcars that an electrical motor is combined with a reducer, and they are mounted as a unit in a housing. In this design, the vibration of the electrical motor propagates to the housing, where the vibration can be intensified and emitted as a loud sound. The transmission path for the vibration from the electrical motor is analyzed as follows. A magnetic vibration (magnetic strain) is generated at the stator coil of the electrical motor, and this vibration is transmitted to the housing. Also, a magnetic vibration is generated at the rotor magnet and is transmitted through the rotor shaft to the housing. The vibrations at the housing are emitted as sounds (hereinafter referred to as "radiating sound") especially from the relatively thin part and from the part which is inferior in stiffness because of their structural simplicity.

To prevent radiating sounds, which can intensify at the housing and are emitted therefrom, there is a method for vibration insulation that cuts off the motor sound by providing the housing with an insulator and by increasing the stiffness and thickness of the housing. Another method for vibration insulation is to provide the housing with a weight, which is used for adjusting the resonance point of the housing, so that the resonance range of the housing is shifted to avoid vibrations within a range of practical rotational speed of the electrical motor.

However, all the above mentioned methods have a problem of increasing the size and weight of the housing.

SUMMARY OF THE INVENTION

It is an object of the present invention to provide a motor drive unit which can reduce the vibration of the motor case and which is easily mounted onto the motor case.

Another object of the present invention is to provide a motor drive unit which can reduce the sound emitted from the housing, the sound being originally transmitted as vibration from the electrical motor.

To achieve this objective, the present invention provides a motor drive unit which comprises an input shaft, an output shaft and at least a couple of gears for enabling power transmission from the input shaft to the output shaft. The input shaft is coupled with the motor shaft of an electrical motor for driving a vehicle, and the output shaft is disposed in parallel with the input shaft and rotationally connected to the drive wheels. The drive unit further comprises a coupled portion and a bearing. The coupled portion connects and holds the output end of the motor shaft and the input end of the input shaft coaxially for the transmission of the driving force of the motor to the input shaft, and the bearing supports the coupled portion rotatably with respect to motor housing. The above mentioned gears are helical gears, which generate a thrust in the direction of the input shaft toward the motor housing while the driving force is being transmitted to the input shaft. Furthermore, the input shaft is provided with an action portion that makes the thrust generated on the input shaft act on the inner ring of the bearing, and the thrust acting on the inner ring then acts on the motor housing via the outer ring of the bearing.

In the drive unit, which is mounted on the motor housing enclosing the motor, the coupled portion (for example, the component indicated by reference number 10a in FIG. 7), which connects the motor shaft and the input shaft of the drive unit, is in spline fitting, so the fit is loose. Therefore, the coupled portion does not restrain the vibration from the motor, so as mentioned above, the vibration propagates to the motor case resonantly via the bearing that is positioned at the coupled portion of these two shafts (this bearing is provided in the motor case, which constitutes the motor housing). The present invention provides an effective prevention against membranous vibrations of the motor case, which vibrations are otherwise caused by high frequency vibrations and sounds coming from the motor. Specifically, the thrust generated on the input shaft of the drive unit in the direction of the motor housing is made to act on the bearing provided on the motor side via the action portion (for example, the collar portion 11 shown in FIG. 7) of the input shaft for the purpose of holding the motor housing. In this way, membranous vibrations which can occur otherwise are restrained. For making the thrust generated on the input shaft of the drive unit act in the direction of the motor housing, the gears that transmit the power of the motor from the input shaft to the countershaft are helical gears, which are designed with helical teeth to improve the contact ratio of meshing teeth during their rotation by generating thrusts that are directed in opposite directions. Therefore, in the meshing of the gear on the input shaft and the gear on the countershaft, an arrangement is made such that the gear on the input shaft generates a thrust toward the motor housing while the gear on the countershaft generates a thrust opposite to the motor housing. Thus, in this arrangement, the input shaft provides only a thrust directed to the motor housing. As a result, the drive unit of the present invention, while achieving intrinsic functions, prevents membranous vibrations, which may otherwise occur on the motor case, without providing means specialized for vibration insulation or increasing the weight of the motor case (motor housing). In other words, the arrangement of the drive unit according to the present invention achieves the intrinsic functions of a motor drive unit as well as that of a vibration insulator.

Preferably, the drive unit according to the present invention further comprises a first bearing which supports the end of the input shaft located opposite to the motor housing and a second bearing which support the end of the input shaft located to the motor housing. In this case, the gear mounted on the input shaft is positioned near the first bearing, and the first bearing is arranged not to receive any thrust in the direction of the input shaft.

As mentioned above, the vibration of the motor case (and the drive unit, which is mounted on the motor case) is restrained by making the thrust on the input shaft of the drive unit act in the direction of the motor housing. However, relatively large forces can act on the bearings that supports both the ends of the input shaft in the drive unit. Specifically, the bearings receive axial thrusts as mentioned above in addition to radial forces that act on the input shaft during the power transmission through the helical gears to the countershaft. As mentioned above, it is important to make the thrust acting on the bearing provided near the motor (referred to as "second bearing") as large as possible. However, to receive a large thrust, the second bearing must be large enough to withstand such a thrust with a sufficient durability. This is not preferable because the enlargement of the second bearing affects the spatial relations of this bearing with other components and leads to an increase in the size and weight of the drive unit as a whole. To solve this problem, as a preferred embodiment of drive unit, the second bearing is arranged to receive all the axial thrust but a minimum radial force. Specifically, the gear on the input shaft for the power transmission to the countershaft is positioned near the end of the input shaft located opposite to the motor, i.e., near the first bearing, and the input shaft is supported in an axially movable manner with respect to the first bearing, so that the first bearing does not receive any thrust of the input shaft. With this arrangement, the first bearing, which is positioned on the side opposite to the motor, receives a relatively large radial force but does not receive any axial thrust. On the other hand, the second bearing, which is positioned on the side of the motor, receives a relatively small radial force and a large axial thrust. As shown in FIG. 9, which describes the relation between the position of the gear and the magnitude of the radial force, the radial force acting on the bearing becomes larger as it is positioned closer to the gear, but it becomes smaller as it is positioned farther from the gear. In other words, in the preferred embodiment of drive unit, the first bearing receives most of the radial force, and the second bearing receives all the axial thrust, with these two bearings having approximately specialized roles. In this way, enlargement of either the first bearing or the second bearing is avoided. It is not necessary to construct the first (or second) bearing as a combination of a radial bearing, which carries a radial force, and a thrust bearing, which carries a thrust force. Therefore, the drive unit according to the present invention does not require a size enlargement and a weight increase.

As mentioned above, the drive unit according to the present invention prevents membranous vibrations by holding the second bearing, which is positioned on the motor side, with a thrust acting on the input shaft. To achieve this prevention means more easily, the input shaft is provided with a collar portion, which holds a portion of the second bearing at an end thereof.

According to another aspect of the present invention, a motor drive unit comprises an input shaft, an output shaft (for example, the countershaft 20 in the following embodiment), at least a couple of helical gears (for example, the first gear 12 and the second gear 22 in the following embodiment), a housing and a first bearing member (for example, the seventh bearing 57 in the following embodiment). The input shaft is coupled with the motor shaft (for example, the rotor shaft 60 in the following embodiment) of an electrical motor (for example, the electrical motor M described in the following embodiment), and the output shaft is disposed in parallel with the input shaft and rotationally connected to the drive wheels of the vehicle. The helical gears enable power transmission from the input shaft to the output shaft, and the housing covers and retains at least the electrical motor, which drives a vehicle. The first bearing member is mounted in the housing and supports rotatably the end of the motor shaft located opposite to the portion coupled with the input shaft. The motor drive unit according to the present invention further comprises an elastic member (for example, the wave spring 82 in the following embodiment), which is provided at the coupled portion and sandwiched between the motor shaft and the input shaft, such that the elastic member pushes the motor shaft and the input shaft away from each other in opposite axial directions. As a result, the drive unit has a variable force for the motor shaft to push the housing via the first bearing member.

In this structural arrangement, with the motor shaft always pushing the housing in the axial direction, the motor shaft acts as a reinforcing structural body (propping beam) for the housing. As a result, the propagation of vibrations from the motor shaft via the first bearing member to the housing is restrained, with a reduced radiating sound being emitted from the housing. In addition, while the motor for driving the vehicle is in operation, the axial thrust acting from the helical gears on the input shaft varies, resulting also in a corresponding variation in the force of the motor shaft pushing the housing. As a result, this varying pushing force effectively improves the vibration insulation of the drive unit in correspondence to the driving force of the motor, which drives the vehicle.

Preferably, the motor drive unit according to the present invention further comprises a second bearing member (for example, the second bearing 52 in the following embodiment), which is mounted in the housing and supports and retains the coupled portion rotatably. With this arrangement, during the operation of the motor, because of the thrust acting from the helical gears on the input shaft, the input shaft pushes the housing via the second bearing member.

In this way, the vibrations propagating from the motor shaft through the second bearing member to the housing are restrained more effectively, with a reduced radiating sound being emitted from the housing.

Furthermore, in the motor drive unit according to the present invention, preferably, the first bearing member comprises a floating bearing, which retains the motor shaft rotatably and supports the motor shaft in a floating manner with respect to the housing.

With this arrangement, the floating structure of the first bearing member prevents impairment of the durability of the first bearing member and of the meshing precision of the helical gears. Also, the elasticity of the floating structure and that of the elastic member sandwiched between the input shaft and the motor shaft function together to absorb vibrations, improving the effect of vibration insulation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 10A~FIG. 10H are schematic diagrams presenting various arrangements for the gears and shafts of the drive unit as examples.

DESCRIPTION OF THE PREFERRED EMBODIMENTS

Figure 1:
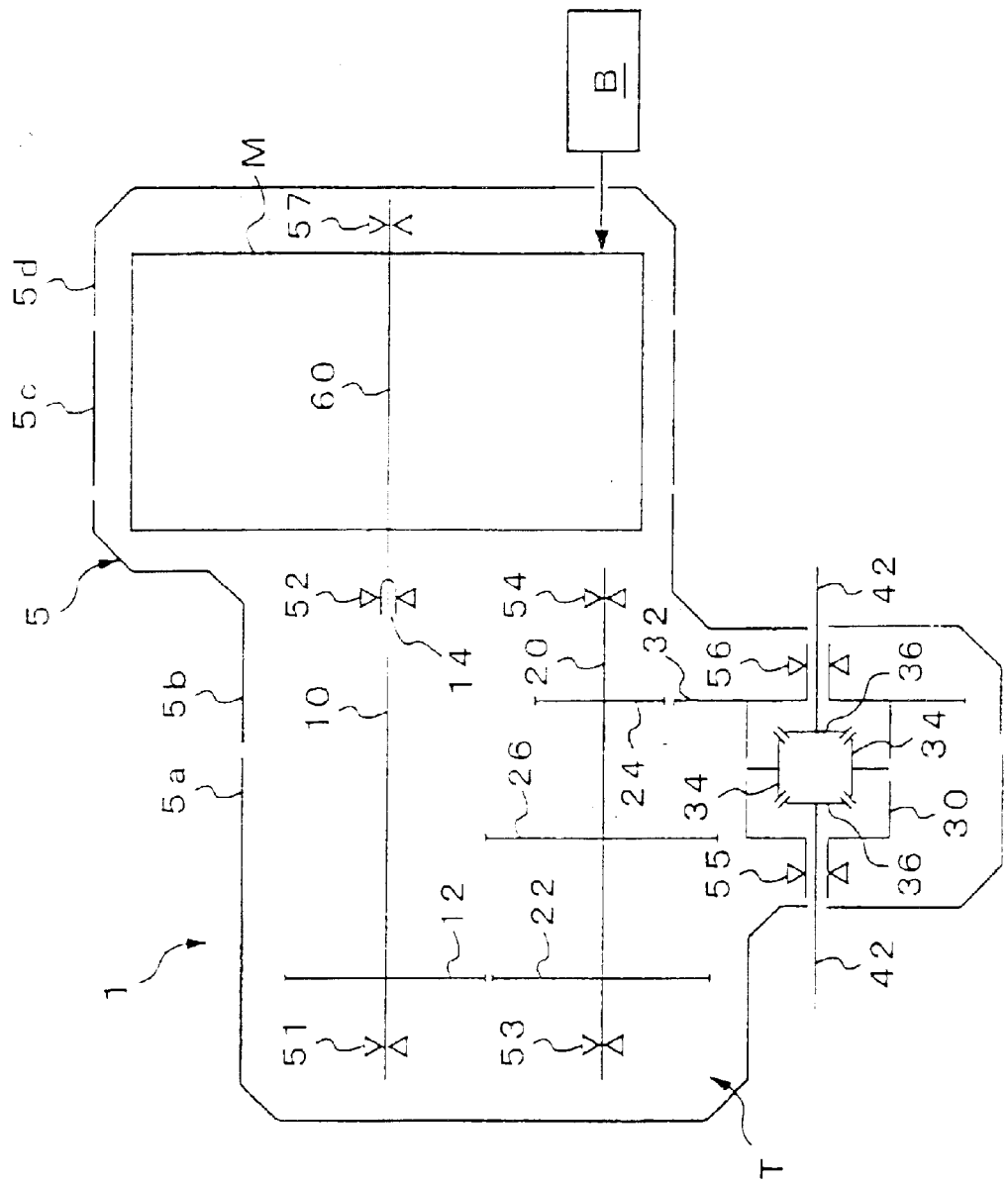
FIG. 1 is a skeleton diagram describing the power transmission paths of a motor drive unit according to the present invention.

A preferred embodiment according to the present invention is described in reference to the drawings. At first, the construction of a motor drive unit (hereinafter simply referred to as "drive unit") according to the present invention is described in reference to FIG. 1~FIG. 4. The drive unit 1 comprises a electrical motor M as prime mover, which receives electrical power from a battery B mounted on a vehicle and rotationally drives a rotor shaft (output shaft) 60. The output of the electrical motor M is transmitted through a reducer T to drive wheels.

This drive unit 1 is housed in a housing 5, which comprises a gear case 5a, a left-side housing (motor gear case) 5b, a center housing 5c and a right-side housing 5d. The reducer T comprises an input shaft 10, a first gear 12, a second gear 22 and a countershaft 20.

One end of the input shaft 10 of the reducer T in the drive unit 1 is supported by a first bearing 51 in the space defined by the gear case 5a and the left-side housing 5b, and the other end is coupled with the rotor shaft 60 of the electrical motor M as a coupled portion 14. At the coupled portion 14, the input shaft 10 together with the rotor shaft 60 as a one-piece body is supported by a second bearing 52 rotatably. The first bearing 51 is mounted in the gear case 5a while the second bearing 52 is mounted in the left-side housing 5b. The input shaft 10 as a male part and the rotor shaft 60 as a female part are fit by splines.

The countershaft 20 is disposed in parallel with the input shaft 10 and supported rotatably by a third bearing 53 and a fourth bearing 54. The third bearing 53 is mounted in the gear case 5a while the fourth bearing 54 is mounted in the left-side housing 5b.

The first gear (main gear) 12, which is fixed on the input shaft 10, meshes with the second gear (counter gear) 22, which is fixed on the countershaft 20. The rotational power input from the electrical motor M to the input shaft 10 is transmitted through these first gear 12 and the second gear 22 to the countershaft 20. On the right side of the second gear 22 on the countershaft 20, provided is a third gear (final drive gear) 24, which always meshes with a fourth gear (final driven gear) 32 fixed in a differential case 30.

In the differential case 30, two differential pinions 34 and 34 mesh with two side gears 36 and 36, to which axle shafts 42 and 42 are fixed extending rightward and leftward. The axis of the right and left axle shafts 42 and 42 are disposed in parallel with the rotational axes of the input shaft 10 and the countershaft 20, and the differential case 30 are supported by a fifth bearing 55 and a sixth bearing 56, so that it can rotate around the axis of the right and left axle shafts 42 and 42. At the ends of the right and left axle shafts 42 and 42, provided are drive wheels, which are not illustrated in the drawing.

As shown, for example, in FIG. 1, a parking gear 26 is fixed on the countershaft 20 between the second gear 22 and the third gear 24. The parking gear 26 itself is not related directly to the present invention, so it is not described any further.

The electrical motor M, whose one end of the rotor shaft 60 is supported by the second bearing 52 at the coupled portion 14 as described above, is surrounded by the left-side housing 5b, the center housing 5c and the right-side housing 5d and sealed and fixed therein with a plurality of connecting bolts. The other end of the rotor shaft 60 is supported rotatably by a seventh bearing 57, which is mounted in the right-side housing 5d.

In the above described construction, a force that acts from the electrical motor M on the second bearing 52, which supports the coupled portion 14 of the rotor shaft 60 of the electrical motor M and the input shaft 10, includes only a radial component without any axial component. This radial component comprises portion of the weight of the rotor (the rotor R shown in FIG. 2 and FIG. 4), which includes the rotor shaft 60, and a couple of forces generated from rotational unbalance. Therefore, the size of the bearing 52 is determined from the diameter of the rotor shaft 60 and the maximum rotational speed, with a generally sufficient allowance in life span. In this case, the second bearing 52 supports the input shaft 10 and the rotor shaft 60 as a one-piece body for the reducer T and the electrical motor M to reduce the number of parts and to achieve further compactness. Because of this arrangement, the second bearing 52 receives part of the reaction force of the driving force acting on the first gear (main gear) 12 as a radial load in addition to the above mentioned radial component. Because the size of the second bearing 52 is determined from the dimension (diameter) of the coupled portion 14, the second bearing 52 is larger than the seventh bearing 57.

On the other hand, because the rotor shaft 60 needs to be unified with the right-side housing 5d for a structural advantage of the electrical motor M, the seventh bearing 57 is mounted in the right-side housing 5d to support the load of the rotor R and to function as a positioning point for ease in the assembly of the electrical motor M. The size of the seventh bearing 57 is typically determined as small as required because the seventh bearing 57 receives a relatively small load.

Now, a detailed description is given of the electrical motor M, which is a source of vibrations, and the housing 5, to which the vibrations are transmitted and emitted there as radiating sounds in the drive unit 1 constructed as described above. The center housing 5c supports the stator S, which constitutes the electrical motor M, and it incorporates a water jacket around the stator S for cooling the electrical motor M. The center housing 5c is sandwiched by the left-side housing 5b and the right-side housing 5d, which are positioned and fixed on the center housing 5c with knockpins and bolts.

The left-side housing (motor gear case) 5b, which is positioned on the output side of the electrical motor M, is combined with the gear case 5a. In the combined condition, they together function to support the coupled portion 14 of the rotor shaft 60 and the input shaft 10 with the second bearing 52, to support the input shaft 10 with the first bearing 51, which is not shown in FIG. 4, and to support the countershaft 20 and the output shafts 42 and 42 with the third~sixth bearings 53~56 for housing the reducer T. To support these shafts, these housing parts are formed larger and stiffer than the right-side housing 5d. In the second bearing 52, which supports the coupled portion 14, the inner ring is fixed on the rotor shaft 60 with a fixing nut 64 while the outer ring is positioned and fixed in the left-side housing 5b with a snap ring 71. On the other hand, the inner ring of the first bearing 51 is fixed on the input shaft 10 with a fixing nut while its outer ring is positioned and fixed in the gear case 5a with a snap ring, which are not shown in FIG. 4.

The right-side housing 5d functions only to support the seventh bearing 57 and to hold three-phase wire terminals 63, from which electric power is supplied to a rotational sensor 62 mounted at the near end of the rotor shaft 60 and to the electrical motor M. Clearly, the right-side housing 5d does not receive a large force as a reaction from the operation of the electrical motor, so it is formed in a relatively simple cover-like structure. In the drive unit, the rotor shaft 60 is anchored in its axial direction by the right-side housing 5d while the input shaft 10 is anchored by the gear case 5a. The mounting of the seventh bearing 57 in the right-side housing 5d is described later.

To the housing 5, which is constructed as described above, vibrations from the electrical motor M can propagate through the following propagation paths. A first path is from the coil of the stator 10 as a vibrating source that generates a magnetic vibration (magnetic strain), through the center housing 5c to the left-side housing 5b and the right-side housing 5d. A second path is from the rotor R with the rotor shaft 60 as a vibrating source that generates a magnetic vibration, through the rotor shaft 60 and then through the second bearing 52 and the seventh bearing 57 to the left-side housing 5b and the right-side housing 5d. In either vibration propagation path, the housing 5, which is a shell for the electrical motor M, is vibrated emitting a radiating sound.

The properties of the housing 5 with respect to the vibration of the electrical motor M are as follows. The center housing 5c is likely to resonate because it is connected directly to the vibrating source, and because it has a simple tubular figure. In fact, it is most likely to emit a radiating sound among the parts of the housing 5.

The right-side housing 5d is also likely to emit a radiating sound because it is influenced via both the paths even though it is located downstream in the first path and the second path. Because the right-side housing 5d is structurally thinnest of all the parts of the housing 5, it does not have much stiffness to resist the vibration of the electrical motor M. Especially, at the central part of the right-side housing 5d, where the journal of the rotor shaft 60 supported by the relatively small seventh bearing 57 is positioned to fix the mass of the rotor R, the housing has a wide membrane, i.e., a relatively thin shell, which can exhibit a "speaker" effect if a vibration is propagated there.

Like the right-side housing 5d, the left-side housing 5b is influenced via both the paths because it is located downstream in the first path and the second path. However, it is less likely to emit a radiating sound than the right-side housing 5d. Reasons are that the second bearing 52, which supports the rotor shaft 60 and is not restrained axially, allows the propagation of only the radial components of the vibrations that pass through the second path to the left-side housing 5b, that the left-side housing 5b has a relatively large stiffness to resist vibrations because it is so designed to function also as a casing for the reducer T, and that the left-side housing 5b has a relatively complicated figure to support a plurality of bearings, with a little membrane, which may resonate. As a result, the left-side housing 5b is unlikely to exhibit a "speaker" effect. Furthermore, because the left side of the left-side housing 5b is coupled with the gear case 5a to cover the reducer T, this structural arrangement attenuates vibrations from the electrical motor M, making radiating sounds less serious.

The gear case 5a is unlikely to receive much of the vibration that propagates through the second path because it is located farthest from the vibrating source (electrical motor M), and because the spline connection of the input shaft 10 and the rotor shaft 60 at the coupled portion 14 is loose. Also, the gear case 5a has a little membrane, which may resonate. As a result, the gear case 5a is least likely to emit radiating sounds of all the parts of the housing 5.

Figure 2:
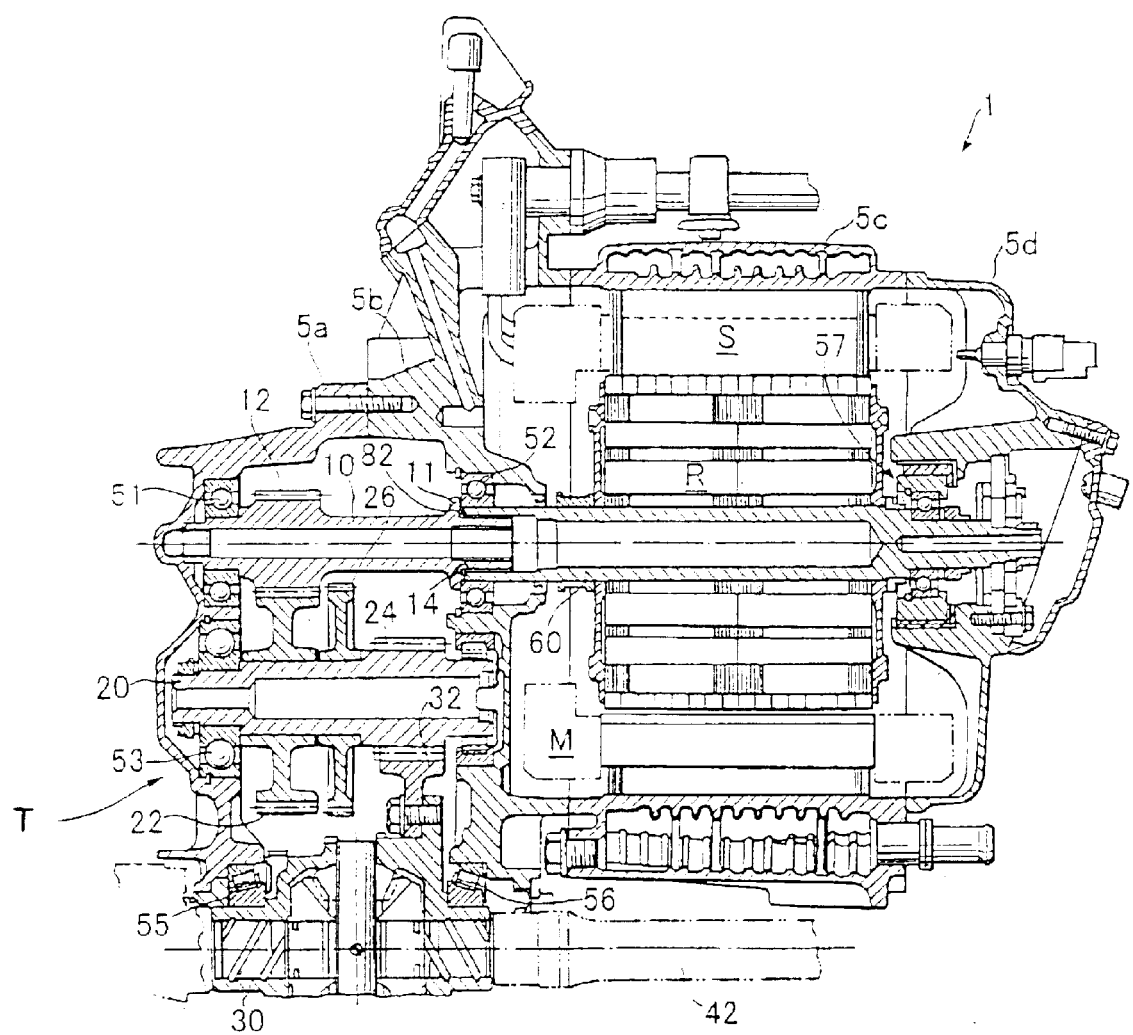
FIG. 2 is a sectional view showing the motor portion of the motor drive unit.
Figure 5:
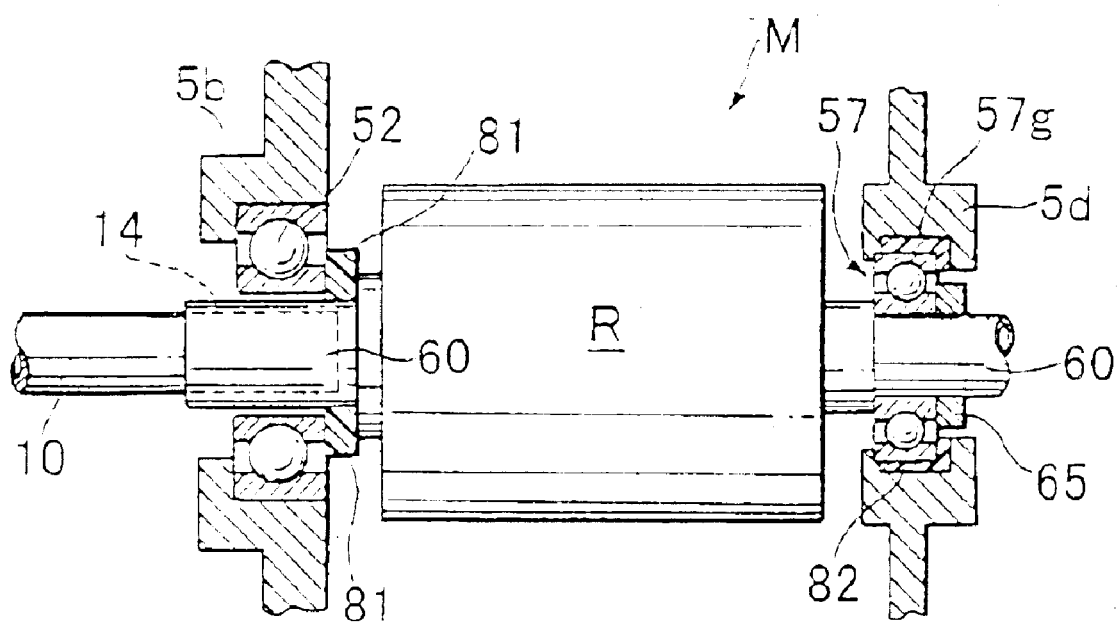
FIG. 5 is diagram describing an arrangement for vibration insulation according to the present invention.

In consideration of the above described conditions, vibration-prevention measures are provided mainly to the right-side housing 5d of the motor drive unit 1 according to the present invention. Specifically, an elastic body is provided between the rotor shaft 60 and at least one of the left-side housing 5b and the right-side housing 5d, which support the rotor shaft 60 at the respective ends thereof, for the elastic body to generate a pushing force axially on the rotor shaft 60 as shown in FIG. 2. For example, a wave spring 81 is provided between the rotor R and the left-side housing 5b through the second bearing 52 as shown in FIG. 5. With this arrangement, the rotor shaft 60 always pushes axially rightward and leftward the left-side housing 5b and the right-side housing 5d, which are connected with the center housing 5c, and the resultant pressure makes these involved components to function together as a reinforcing structural body (propping beam). As a result, the propagation of vibrations to the housing 5 is restrained with a reduced radiating sound.

Figure 6:
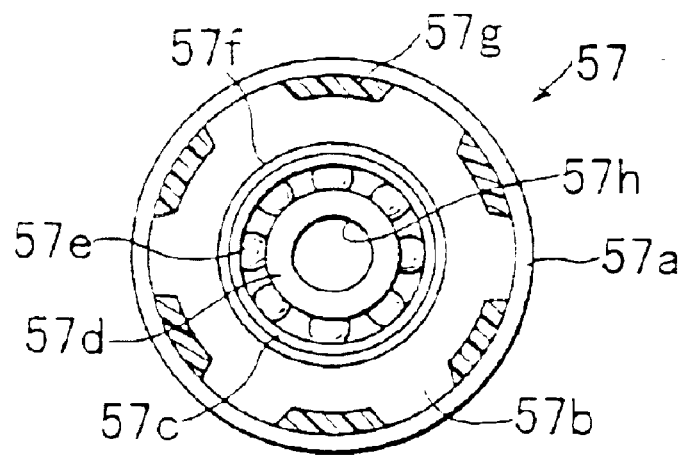
FIG. 6 is a top view of a floating bearing.

In this arrangement, the bearing located on the side away from the input shaft 10, i.e., the seventh bearing 57, may have a floating structure of cushioning material against the right-side housing 5d. FIGS. 5 and 6 show a bearing having such a floating structure. This floating bearing 57 comprises a cylindrical outer shell 57a, an inner hub 57b, a ball bearing, a snap ring 57f and a damper material 57g. The inner hub 57b has a plurality of inro portions (six portions in this embodiment) with a central bore. The ball bearing comprises an outer ring 57c, which is fit in the bore of the inner hub 57b, and an inner ring 57d, which is coupled through a plurality of balls 57e with the outer ring 57c. The snap ring 57f is used to fix the outer ring 57c in the inner hub 57b, and the axial and radial clearances between the outer shell 57a and the inner hub 57b are filled with the damper material 57g. The damper material can be, for example, a resin or a rubber, which is baked onto the inner hub 57b.

For the mounting of the seventh bearing 57, the outer shell 57a is press-fit into the mounting bore provided in the right-side housing 5d. Also, one end of the rotor shaft 60 is inserted into the bore 57h of the inner ring 57d, and the rotor shaft 60 and the seventh bearing 57 are fixed with a fixing nut 65. The outer shell 57a and the inner hub 57b are so designed to be in loose fit. Therefore, while the electrical motor M is in operation, the inner hub 57b floats against the outer shell 57a because of the presence of the damper material 57g. In addition, the floating bearing (seventh bearing) 57, which incorporates the damper material 57g, acts like an elastic body, especially in the axial direction, between the right-side housing 5d and the rotor shaft 60.

In this arrangement of the drive unit, the elastic structural bodies (the wave spring 81 and the damper material 57g of the seventh bearing 57) provided between both the ends of the rotor shaft 60 and the left-side housing 5b and the right-side housing 5d, respectively, attenuate vibrations being propagated from the rotor shaft 60, reducing the vibration of the housing 5. Especially, the radiating sound being emitted from the right-side housing 5d is reduced. Also, with the seventh bearing 57, which is located on the side opposite to the first gear 12 of the reducer T, having a floating structure, means for vibration insulation and sound insulation is realized for the bearing of the rotor shaft (seventh bearing 57) without impairing the durability of the bearing and the precision of gear meshing.

However, it is not preferable to apply such a floating structure for the second bearing 52. If the second bearing 52 were a floating bearing, then the bearing would receive a reaction force from the first gear 12, which could deteriorate the meshing precision of the first gear 12 and the second gear 22, resulting in a gear noise. As mentioned above, the right-side housing 5d is dominant in emitting radiating sounds among all the parts of the housing 5. Therefore, there is little effect for vibration insulation even if the second bearing 52, which is fixed in the left-side housing 5b, were made to float structurally.

In the floating bearing 57, the radial inro clearance, the volume of the damper material 57g and the clearance between the outer shell 57a and the inner hub 57b are all determined in correspondence to working loads. In addition, the radial inro clearance is determined to be sufficiently larger than the clearance between the rotor R and the stator S of the electrical motor M to secure safety even in a case where the damper is damaged, or an excessive input is experienced.

As mentioned above, with the provision of the elastic bodies (the wave spring 81 and the seventh bearing 57), the reaction forces of the elastic bodies act constantly between the left-side housing 5b and the right-side housing 5d at an initial load value that is determined when the electrical motor M is mounted (that is preloaded). In the following description, motor drive units in this structural arrangement are referred to as "fixedly preloaded type".

Figure 7:
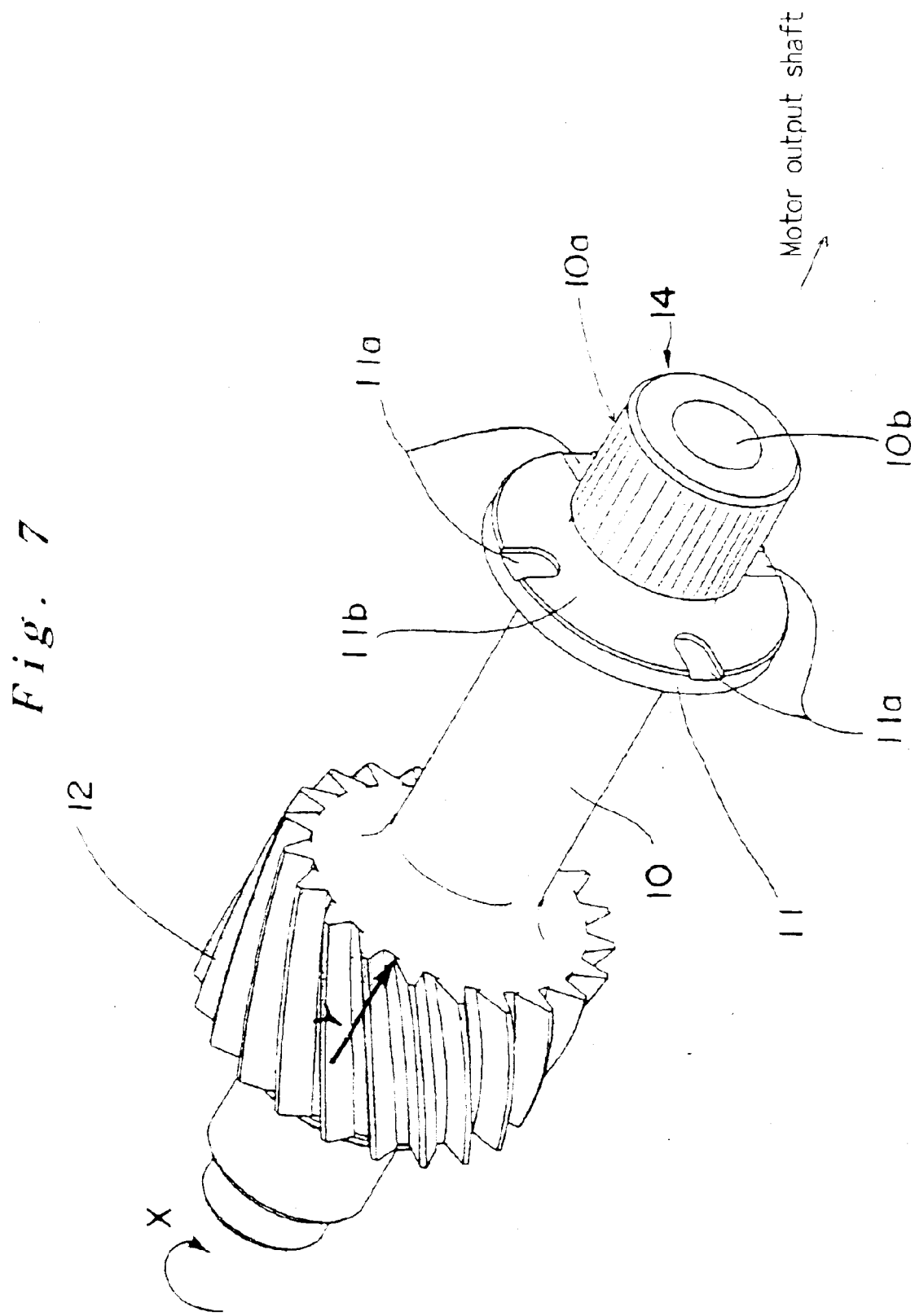
FIG. 7 is a perspective view showing the input shaft and a first gear.

As shown in FIG. 7, the first gear 12, which transmits the rotational power of the input shaft 10 to the countershaft 20, is a helical gear, which meshes with the second gear 22 on the countershaft 20. The first gear 12, which is a helical gear, is designed to generate an axial thrust toward the electrical motor M. During the operation of the electrical motor M, for example, when the input shaft 10 is rotated in the direction indicated by arrow "X" in the drawing, a thrust is generated in the direction indicated by arrow "Y". Therefore, a variably preloaded type motor drive unit can be constructed by adding the thrust being generated by the first gear 12 to the reaction forces of the above mentioned elastic bodies 81 and 57. The following section describes such a variably preloaded type motor drive unit with respect to FIG. 2.

As shown in FIG. 2, a collar portion 11 is provided on the input shaft 10 at the portion 14 coupled with the rotor shaft 60, for applying the thrust generated by the input shaft 10 onto the rotor shaft 60. The collar portion 11 comes into contact with the inner ring of the second bearing 52 as well as with the end of the rotor shaft 60 when the input shaft 10 is connected with the rotor shaft 60 in spline fitting. In addition, an elastic body (wave spring 82) is provided between the collar portion 11 and the end face of the rotor shaft 60 (the wave spring 82 and related components are detailed in FIG. 8). The wave spring 82 pushes the input shaft 10 and the rotor shaft 60 to depart from each other. With this arrangement, the rotor shaft 60 set in its position pushes the right-side housing 5d via the seventh bearing 57 while an additional push from the thrust generated on the input shaft 10 acts axially onto the rotor shaft 60. The following section describes a variably preloaded type motor drive unit 1 that incorporates the component shown in FIG. 7 and other components that are identical to those of the above described fixedly preloaded type motor drive unit 1, except those parts relating to the coupled portion 14 of the input shaft 10 and the rotor shaft 60.

With the thrust generated by the first gear 12 being applied onto the rotor shaft 60 through the wave spring 82, the reaction forces of the elastic bodies (the wave spring 82 and the seventh bearing 57) act between the gear case 5a and the right-side housing 5d via the wave spring 82 and the input shaft 10. Also, during the operation of the electrical motor M, the axial component of the reaction force against the input shaft 10 acts to oppose the pushing force of the wave spring 82. As a result, the pushing force on the right-side housing 5d is varied in correspondence to the driving force of the electrical motor M while the vehicle is traveling. In other words, the greater the vibration while the driving force of the electrical motor M is relatively large, the greater the pushing force acting onto the right-side housing 5d, improving the effect of vibration insulation. The relation between the magnitude of the pushing force on the right-side housing 5d and the effect of the vibration insulation reducing the radiating sound varies in correspondence to the specifications of the electrical motor M used. However, this structural arrangement is preferred when a relatively large pushing force is required.

Because the thrust being generated by the first gear 12 pushes the second bearing 52 via the collar portion 11, which is provided on the input shaft 10, the vibration being propagated from the rotor shaft 60 through the second bearing 52 to the left-side housing 5b is reduced, improving the effect of vibration insulation for the housing 5.

It is clear from the above description that in the motor drive unit according to the present invention, the motor shaft functions as a reinforcing structural body (propping beam) for the housing because an elastic body is provided between the input shaft and the motor shaft to push these shaft away from each other, with the motor shaft pushing the housing via a first bearing member that retains the motor shaft. As a result, the vibration being propagated from the motor shaft through the first bearing member to the housing is restrained, thereby reducing the radiating sound being emitted from the housing. Furthermore, the pushing force, by which the motor shaft pushes the housing, is varied by the thrust being generated on the input shaft by the helical gear during the operation of the motor, which drives the vehicle. As a result, the pushing force is varied in correspondence to the driving force of the motor, improving the effect of vibration insulation.

Also, while the coupled portion of the motor shaft and the input shaft is retained by a second bearing member, the input shaft is directed to push the housing via the second bearing member by the thrust generated on the input shaft. As a result, the vibration being propagated from the motor shaft through the second bearing member to the housing is restrained, so the radiating sound being emitted from the housing is reduced. Therefore, this arrangement is more effective.

Furthermore, the first bearing member is constructed as a floating bearing, which retains the motor shaft rotatably in floating condition against the housing, without impairing the durability of the first bearing member and the meshing precision of the helical gears. As a result, the elasticity of the floating structure and the elasticity of the elastic body, which is sandwiched between the input shaft and the motor shaft, together absorb the vibration being propagated from the motor shaft and improve the effect of vibration insulation.

Figure 3:
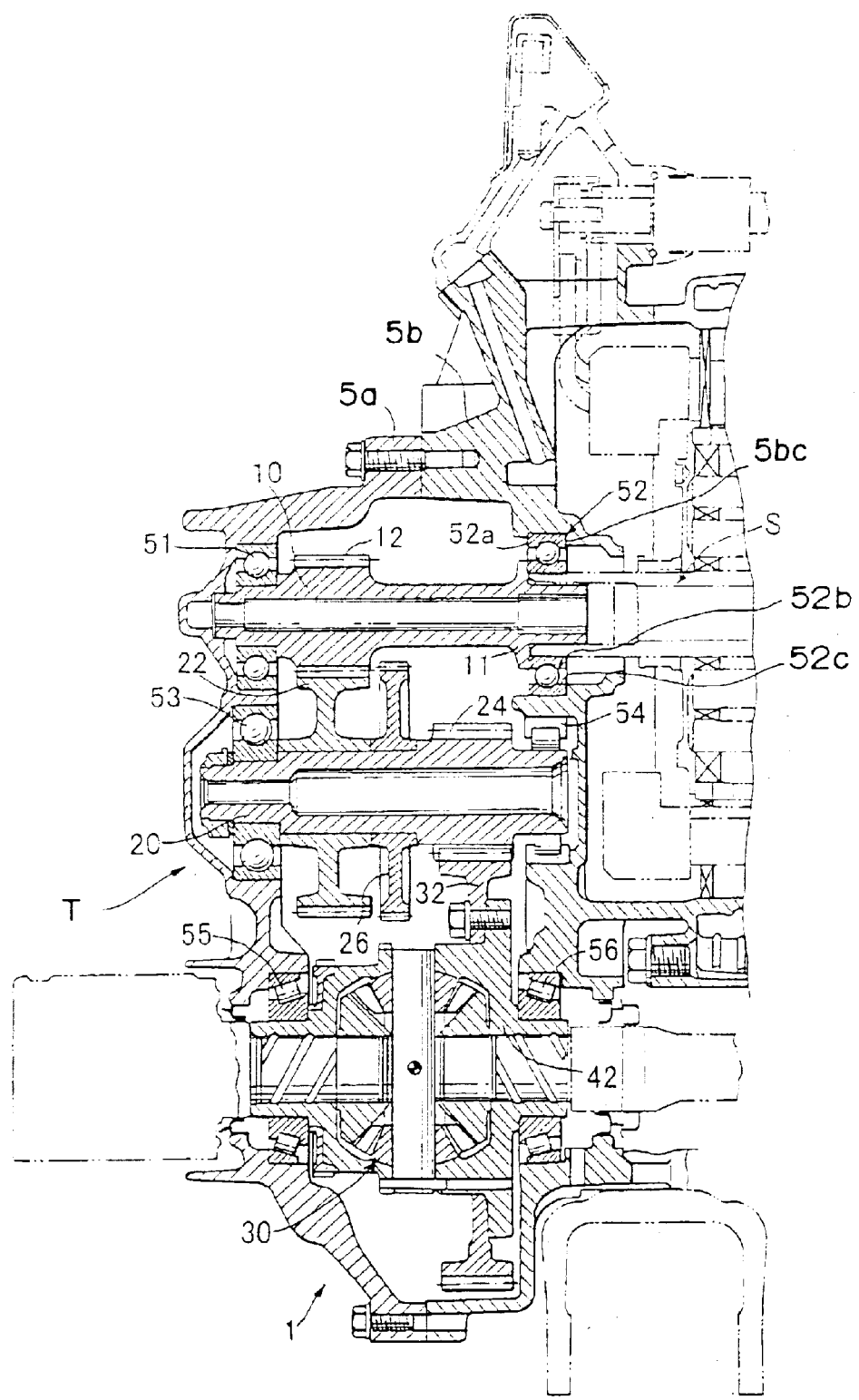
FIG. 3 is a sectional view showing the reducer portion of the motor drive unit.
Figure 4:
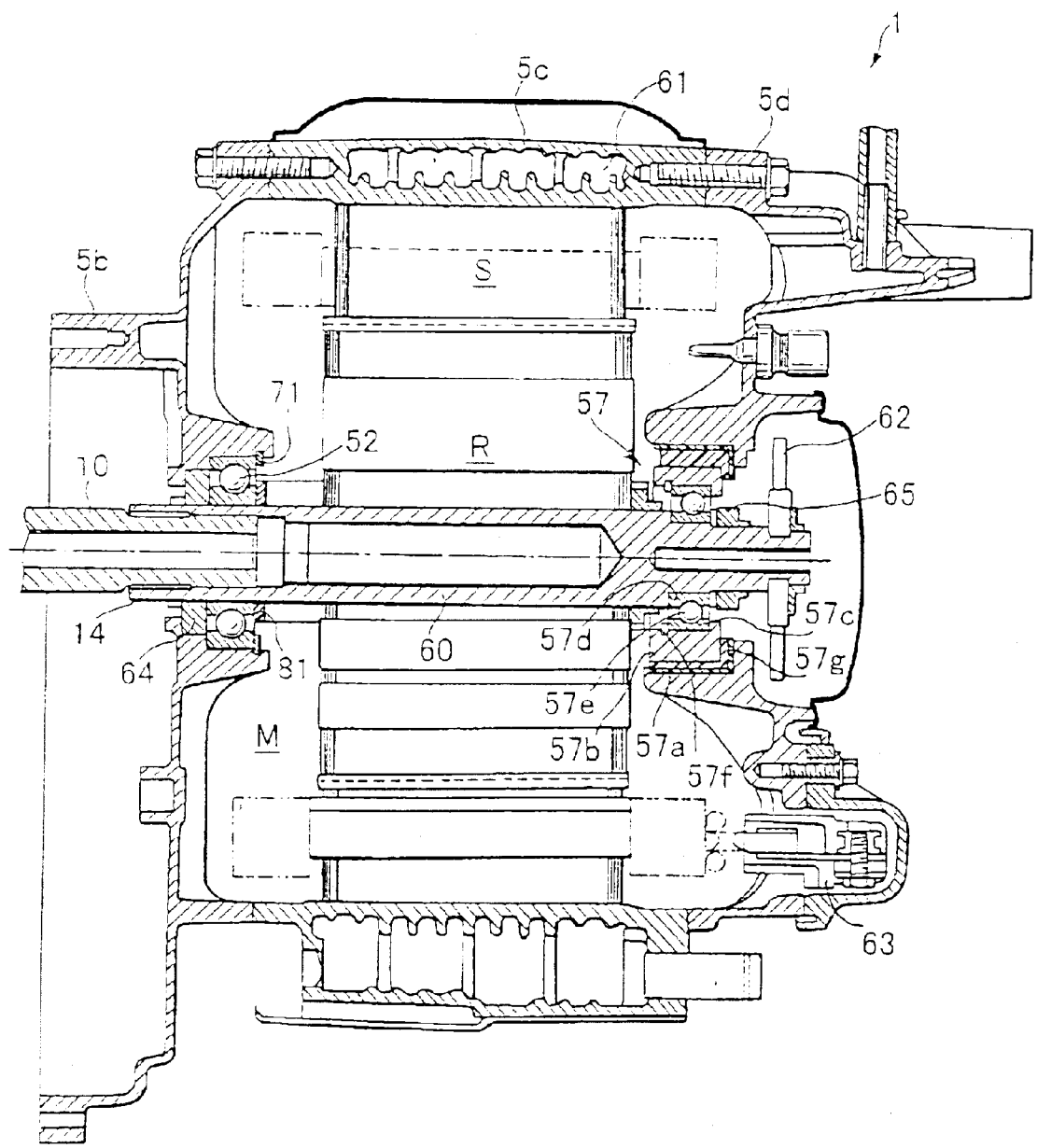
FIG. 4 is a sectional view showing the motor portion of the motor drive unit.
Figure 9:
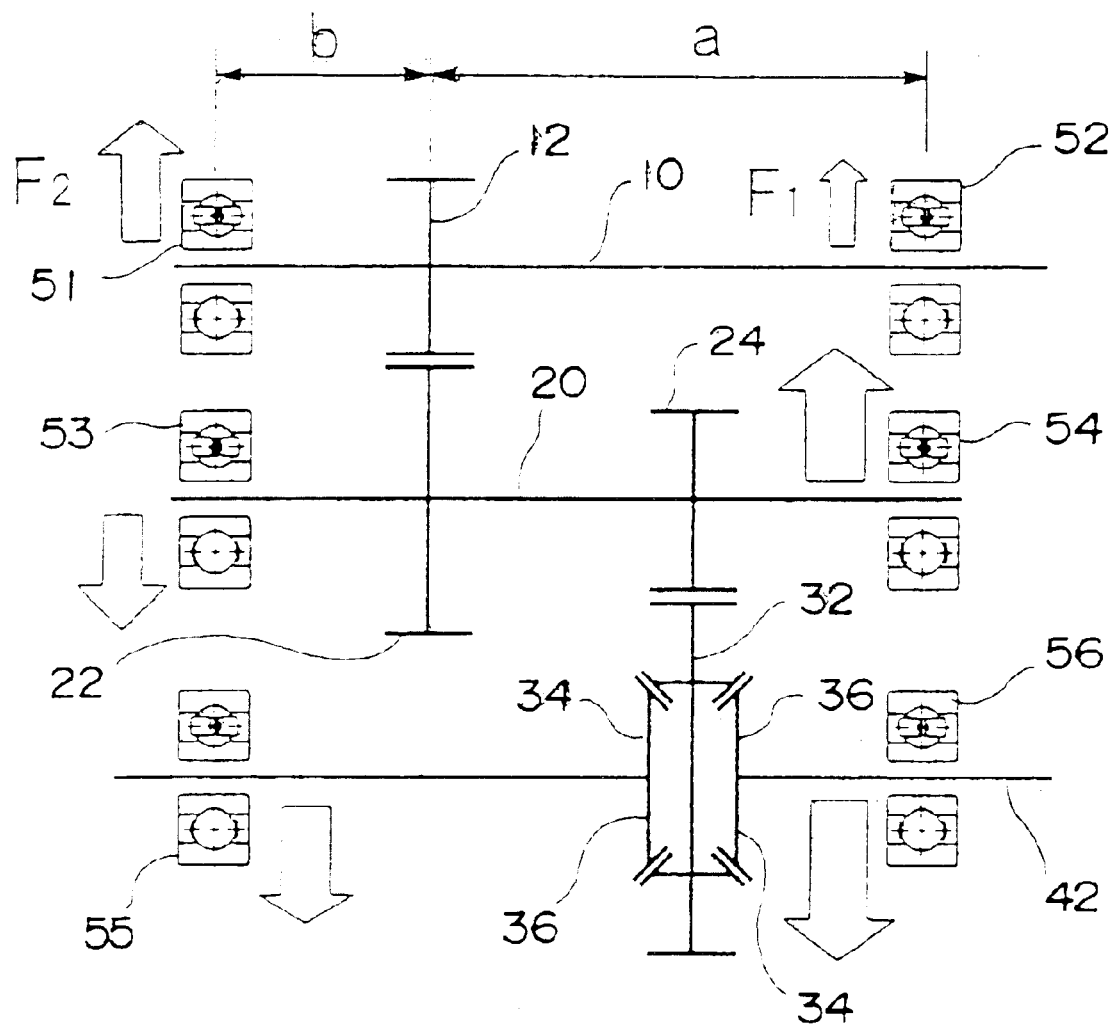
FIG. 9 is a diagram describing the positions of the gears and the bearings in the drive unit and the radial forces acting on the bearings.

Now, in reference to FIG. 3 and FIG. 9, a description is given of the forces acting on the input shaft 10 of the drive unit 1 according to the present invention.

As shown in FIG. 3, the first gear 12, which transmits the rotational power of the input shaft 10 to the countershaft 20, is a helical gear, which meshes with the second gear 22, i.e., the helical gear mounted on the countershaft 20. As described above, the meshing of the helical gears generates thrusts that are directed axially opposite to each other. Specifically, the first gear 12 has helical teeth as shown in FIG. 7, and each tooth of the first gear 12 comes into surface contact with a corresponding tooth of the second gear 22 while the input shaft 10 is rotated. Because helical gears are so designed to improve their contact ratio that the respective tooth faces in contact, which are slanted from the axis of the input shaft, push each other, generating thrusts not only in the rotational direction but also in the axial direction. For example, while the input shaft 10 is rotating in the direction indicated by arrow "X" (for the normal rotational direction of the electrical motor M), a thrust is generated in the direction indicated by arrow "Y".

Figure 8:
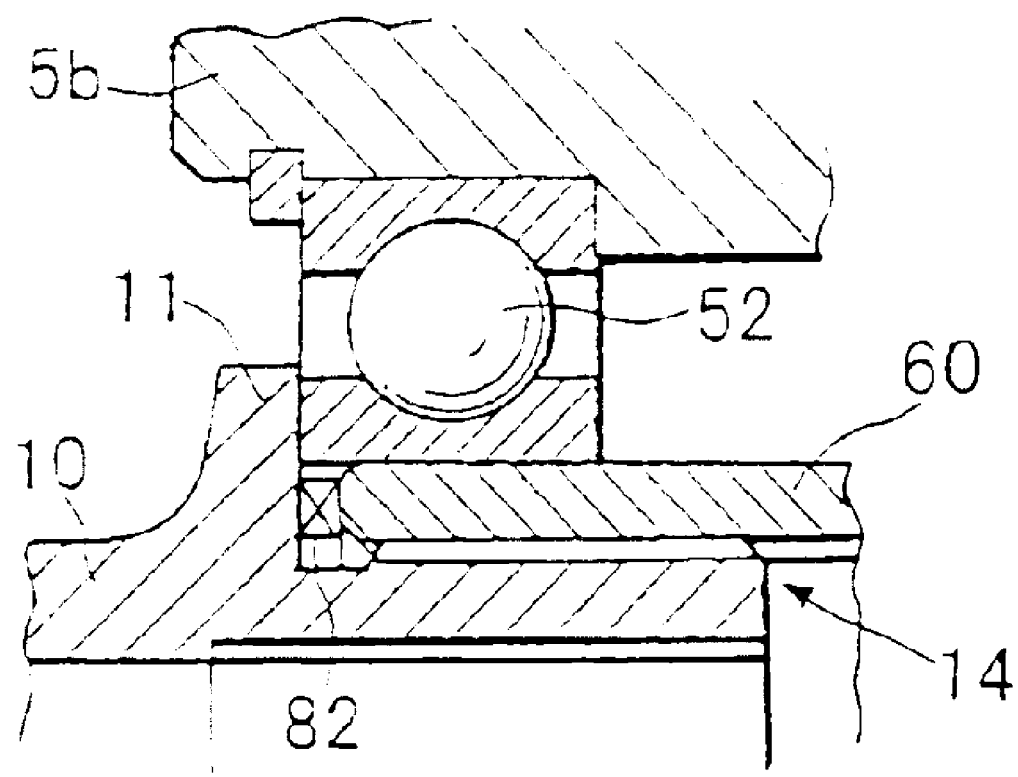
FIG. 8 is a sectional view showing an important section of a variable preloaded type motor drive unit.

Now, means for transmitting this thrust to the housing, i.e., to the left-side housing 5b, is described in reference to FIG. 3. The motor-side end of the input shaft 10 is supported by the second bearing 52, which is mounted in the motor case 5b as a one-piece body. The rotor shaft 60, i.e., the output shaft of the motor, rotates in contact with the inner ring 52b of the second bearing 52. In addition, the input shaft 10 and the rotor shaft 60 are connected in spline fitting, with the former being a male part and the latter being a female part. Therefore, the thrust from the input shaft 10 is led to an end face 52a of the second bearing 52, more specifically, to the end face of the inner side, so that the thrust can act on the inner ring 52b of the second bearing 52, pushing the left-side housing 5b to the motor side. In other words, the thrust acting on the inner side of the end face 52a of the second bearing 52 is transmitted from the outer ring 52c of the second bearing 52 to the holding part 5bc of the left-side housing 5b. Therefore, the left-side housing 5b is held onto the motor side, i.e., the right side in FIG. 3. This holding by a thrust is realized by the collar portion (collar element) 11, which is provided as a one-piece body with the input shaft 10. Specifically, the contact face 11b of the collar portion 11 is in contact with the inner side of the end face 52a of the second bearing 52 as shown in FIG. 7 and FIG. 8. In this condition, while the input shaft 10 is rotating with the collar portion 11, the end face 52a of the second bearing 52 does not rotate. This can present a problem of frictional wear. Therefore, in this embodiment, the contact face 11b of the collar portion 11, which is in contact with the end face 52a of the second bearing 52, is provided with a groove 11a for lubrication oil as shown in FIG. 7.

More specifically, the input shaft 10 has a tubular structure with a through-hole 10b as a passage for lubrication oil, and lubrication oil is supplied from the left side in FIG. 7 through the input shaft 10 to the spline portion 10a at the portion coupled with the rotor shaft (motor output shaft) 60. The lubrication oil passing through the spline portion 10a flows into the groove 11a, which is provided in the collar portion 11, and then it is sprayed outward by the centrifugal force generated by the rotation of the input shaft 10. In this way, the spline portion is protected with the lubrication oil against abrasion, and at the same time, the contact face 11b of the collar portion 11 and the inner side of the end face 52a of the second bearing 52, which is in contact with the collar portion 11, are also protected with the lubrication oil against abrasion.

Now, the distribution of the thrust generated at the first gear 12 is considered. As mentioned above, the thrust acts in the direction of the motor (rightward in the drawings). However, if the component of the thrust distributed to the second bearing 52 is larger, the above mentioned holding effect becomes weaker. Therefore, in this embodiment, between the first bearing 51 and the second bearing 52, which support the input shaft 10, the distribution of the thrust is arranged to minimize the component of the thrust acting on the first bearing 51 to zero and to maximize that acting on the second bearing 52 by structurally allowing the shift of the input shaft 10 with respect to the second bearing 52.

Now, a description is made of the relation between the position of the first gear 12 on the input shaft 10 and the radial force generated on the input shaft 10.

FIG. 9 is a schematic diagram describing the positions of the gears 12, 22, 24 and 32 and the bearings 51~56 provided on the shafts 10, 20 and 42 in the drive unit 1. As far as the input shaft 10 is concerned, for example, the first gear 12 is mounted at a position that has distance "b" from the first bearing 51 and distance "a" from the second bearing 52. In this case, the radial forces F1 and F2 acting on the first and second bearings, respectively, from the first gear are described in the follow relation.

$$F1:F2=b:a$$

Therefore, the distribution of the radial force between the first and second bearings 51 and 52, which support the respective ends of the input shaft 10, is such that the closer the first gear 12 is positioned, the larger the radial force acting on the bearing. In other words, as the first gear 12 becomes farther, the radial force acting on the bearing becomes smaller. This relation is the same for the fifth and sixth bearings 55 and 56, which support the output shaft 42. However, the radial forces of the second and third gears 22 and 24 act in the directions opposite to each other for the third and fourth bearings 53 and 54, which support the countershaft 20. In this case, the radial forces distributed from one gear and acting on the bearings are offset by those distributed from the other gear in the opposite direction, resulting in the distribution of only the difference of the radial forces. Therefore, as far as the first and second bearings 51 and 52 are concerned, because the first gear 12 is positioned closer to the first bearing 51, most of the radial force is distributed to the first bearing 51, and a little radial force is distributed to the second bearing 52.

Here, a consideration is made of the correlation between the radial forces and the above described thrusts acting on the first and second bearings 51 and 52. The first bearing 51 receives a relatively large radial force but no axial thrust. On the other hand, the second bearing 52 receives all the axial thrust and a little radial force. In other words, generally, the first bearing 51 receives the radial force while the second bearing 52 receives the axial thrust. Therefore, by applying the structural arrangement of this embodiment, a relatively large thrust is achievable for the second bearing 52 to prevent membranous vibration on the motor case. Nevertheless, in designing stage, forces can be distributed appropriately between the first and second bearings 51 and 52 without distributing an excessive force to the second bearing 52. In this way, enlargement and weight increase are avoided for securing the durability of the second bearing 52.

According to the structure of this embodiment, the first and second bearings 51 and 52 can be relatively small, and the distances among the shafts can be relatively short. As a result, the drive unit 1 itself can be miniaturized, with the forces acting on the first and second bearings 51 and 52 being distributed appropriately.

The above sections have described of the means that prevents membranous vibration on the motor case, by focussing on the forces acting on the first and second bearings 51 and 52. However, for miniaturization of the drive unit, it is also important to make an appropriate balance in the relation between the radial force and the axial thrust acting on each bearing in consideration of the positions of corresponding gears in the drive unit. In the following section, the arrangement of gears in a drive unit used for an electric motorcar is specifically determined and verified.

Figure 10C:
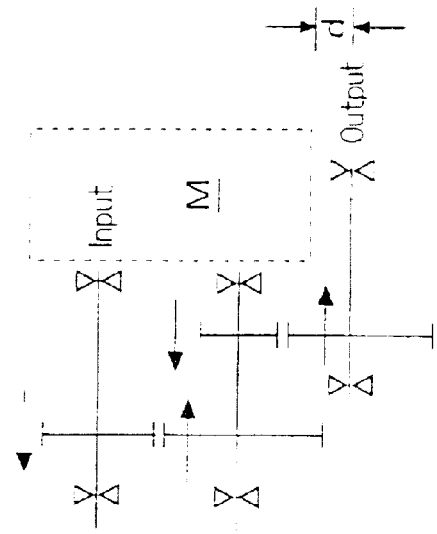
Figure 10B:
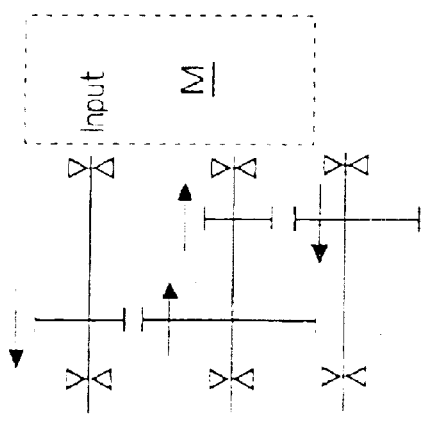
Figure 10A:
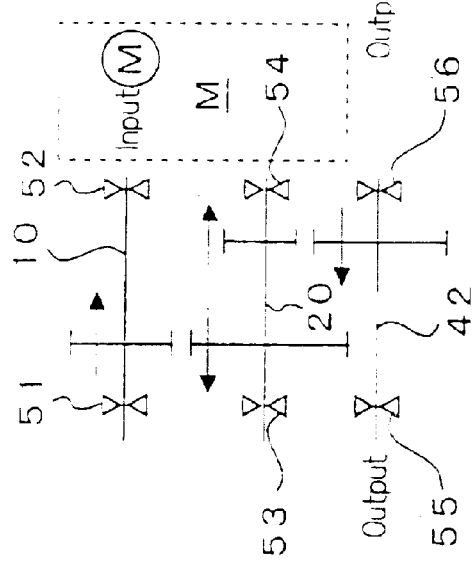
Figure 10D:
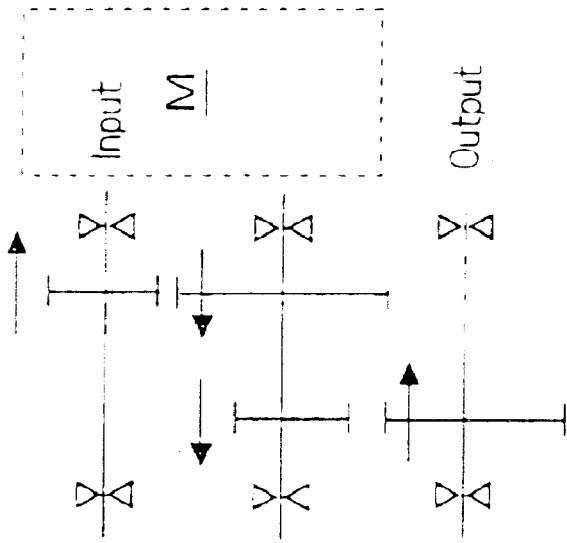
Figure 10E:
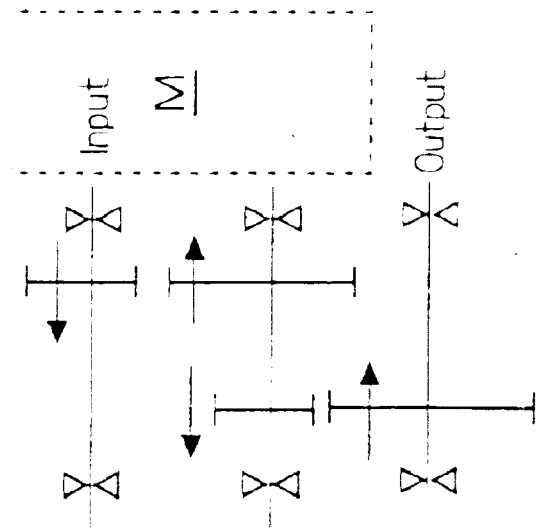
Figure 10F:
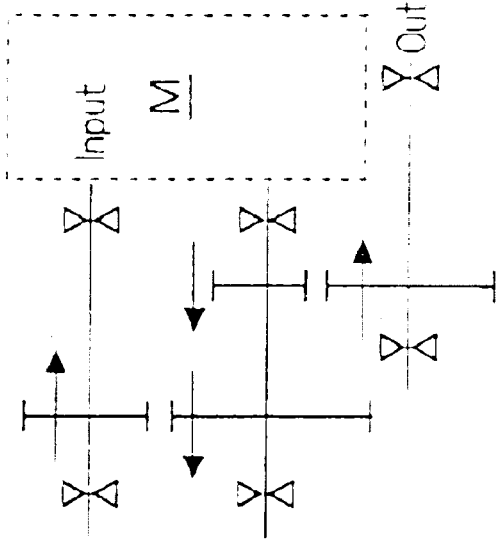

FIG. 10A~FIG. 10H are schematic diagrams presenting possible arrangements of gears and shafts for a drive unit 1. In the drawings, the components shown with reference numbers in FIG. 10A are also present and referred with the same numbers in the other drawings although they are omitted. In addition, FIG. 10A~FIG. 10H show only examples in which the direction of the axial thrust acting on the output shaft is to the output side of the drive unit. As described above, if the gear is positioned near the bearing, then a relatively large radial force is distributed to the bearing. In the case of the output shaft, the sixth bearing 56 would receive this large radial force in addition to an axial thrust, which forces acting together could be excessive if the arrangement of the gear were such. However, the drive unit is intended to reduce the rotational speed of the rotation input from the motor and to increase the rotational force for output. Therefore, such an arrangement or positioning of the gear on the output shaft is not considered here, and such examples are not shown in FIG. 10A~FIG. 10H.

The structure shown in FIG. 10A is identical with that of the above described embodiment according to the present invention. In this case, membranous vibration on the motor case is prevented as described above. In addition, a sufficient space is available for installation of a relatively large motor M because the output shaft 42 extends in the direction opposite to the input side (motor side). In the case shown in FIG. 10B, the first and third bearings 51 and 53 receive relatively large radial forces and axial thrusts, respectively. Because the loads acting on the bearings are large, the first and third bearings 51 and 53 must be correspondingly large, or the motor should not be a high power model. Also in the case shown in FIG. 10C, the load to the first bearing 51 is relatively large. This leads to an enlargement of the drive unit. Furthermore, in this case, the output shaft 42 extends toward the motor side (rightward in the drawing), requiring that the output shaft 42 be positioned away from the lower end of the motor M by distance "d". This condition limits the size of the motor M and prevents use of a high power motor. In the case shown in FIG. 10D, because the axial thrusts generated on the countershaft 20 are in the same direction, they are not offset. As a result, the third bearing 53 must receive a large load, resulting in an enlargement of the third bearing 53. Also in this case, the size of the motor M is limited, preventing installation of a high power motor as in the case shown in FIG. 10C. In the case shown in FIG. 10E, the forces are balanced well, but the second bearing 52 receives a large radial force. This condition presents a problem of enlargement of the drive unit. Also in the case shown in FIG. 10F, the second bearing 52 receives a large radial force, which leads to an enlargement of the drive unit. In addition, the axial thrusts generated on the countershaft 20 are not offset by each other, so the load to the fourth bearing 54 is excessive. Also in the case shown in FIG. 10G, the second bearing 52 receives a large radial force in addition to an axial thrust. This leads to an enlargement and weight increase of the drive unit. Furthermore, the axial thrusts generated on the countershaft 20 are not offset. Also in the case shown in FIG. 10H, the second bearing 52 receives a large radial force in addition to an axial thrust. This leads to an enlargement and weight increase. Therefore, it is clear from the above discussion that the arrangement shown in FIG. 10A, which is identical with the above described embodiment according to the present invention, is most preferable of all the examples shown in FIG. 10A~FIG. 10H.

According to the drive unit of the present invention, the axial thrust generated on the input shaft is led in the direction toward the motor, so that the thrust can act on the second bearing to prevent membranous vibration on the motor case, which vibration can otherwise occur in an intensified fashion from a relatively high frequency vibration that is generated from the motor. As a result, a restraint is provided for controlling the vibration and sound that can propagate from the drive unit outward. Furthermore, according to the drive unit of the present invention, the forces acting on the first and second bearings, which support the input shaft, are distributed appropriately. If these forces were not balanced well, then it would be necessary for the size and weight of either bearing to be increased. However, these forces are distributed appropriately in the drive unit according to the present invention, so miniaturization and weight saving can be achieved for the drive unit as a whole.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2002-345212 filed on Nov. 28, 2002 and No. 2003-193416 filed on Jul. 8, 2003 which are incorporated herein by reference.

What is claimed is:

1. A motor drive unit comprising:
an electrical motor;
an input shaft, which is coupled with a motor shaft of said electrical motor;
a housing, which covers and retains at least said electrical motor;
a first bearing member, which is mounted in said housing to support rotatably an end of said motor shaft on a side opposite to the coupled portion of said motor shaft; and
an elastic member, which is provided at the coupled portion and sandwiched between said motor shaft and said input shaft, such that said elastic member generates reaction forces in opposite axial directions to push said motor shaft and said input shaft away from each other;
wherein:
the reaction forces of said elastic member act on said motor shaft to push said first bearing member axially, thereby pushing said housing.

2. The motor drive unit as set forth in claim 1, further comprising:
an output shaft, which is disposed in parallel with said input shaft; and
at least a couple of helical gears, which enable power transmission from said input shaft to said output shaft;
wherein:
while said electrical motor is in operation, and the rotation of said motor shaft is transmitted from said input shaft through said helical gears to said output shaft, an axial thrust acting from said helical gears on said input shaft pushes said first bearing member to said housing via said motor shaft.

3. The motor drive unit as set forth in claim 2, further comprising a second bearing member, which is mounted in said housing to support rotatably said coupled portion of said motor shaft;
wherein:
while said electrical motor is in operation, and the rotation of said motor shaft is transmitted from said input shaft through said helical gears to said output shaft, an axial thrust acting from said helical gears on said input shaft pushes said second bearing member to said housing.

4. The motor drive unit as set forth in claim 3, wherein:
said motor shaft and said input shaft are connected coaxially by fitting male splines provided at the coupled portion of said input shaft into female splines provided at the coupled portion of said motor shaft;
said second bearing member supports rotatably said motor shaft at the coupled portion thereof with respect to said housing;
a collar portion provided at the coupled portion of said input shaft is in contact with a side face of said second bearing member; and
an axial thrust acting on said input shaft from said helical gears pushes said second bearing member to said housing.

5. The motor drive unit as set forth in claim 1, wherein:
said first bearing member is a floating bearing, which retains said motor shaft rotatably and supports said motor shaft in floating manner with respect to said housing.

6. The motor drive unit as set forth in claim 5, wherein said floating bearing comprises:
a tubular outer shell;
an inner hub, which is provided with a plurality of inro portions and with a central through-hole, and which is fit loosely in said outer shell;
a bearing, which is mounted in said inner hub, fitting in said through-hole; and
a damper material, with which axial and radial openings provided between said outer shell and said inner hub are filled.

7. A motor drive unit comprising:
an electrical motor;
an input shaft, which is coupled with a motor shaft of said electrical motor;
an output shaft, which is disposed in parallel with said input shaft;
a housing, which covers and retains at least said electrical motor;
at least a couple of helical gears, which enable power transmission from said input shaft to said output shaft; and
a coupled side bearing, which supports rotatably, with respect to said housing, a coupled portion where an output end of said motor shaft and an input end of said input shaft are connected coaxially;
wherein:
while said electrical motor is in operation, and the rotation of said motor shaft is transmitted from said input shaft through said helical gears to said output shaft, a thrust is generated in the direction of said input shaft toward said motor housing;
said input shaft is provided with an action portion that makes said thrust act on an inner ring of said coupled side bearing; and said thrust acting on said inner ring pushes said coupled side bearing to said motor housing.

8. The motor drive unit as set forth in claim 7, further comprising an opposite side bearing, which supports rotatably the end of said input shaft located opposite to said coupled portion thereof, wherein:

one of said helical gears mounted on said input shaft is positioned near said opposite side bearing;

said thrust is received by said coupled side bearing; and said thrust dose not act on said opposite side bearing.

* * * * *